D. C. HOOKER.
KNOCK-OUT FOR ELECTRICAL BOXES.
APPLICATION FILED JUNE 27, 1918.
1,295,168.   Patented Feb. 25, 1919.
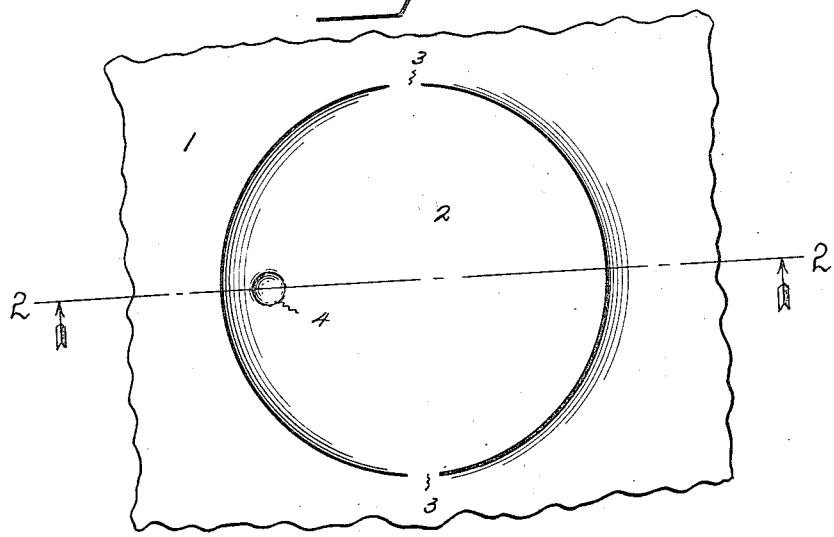
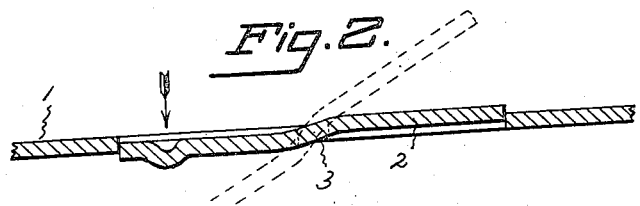
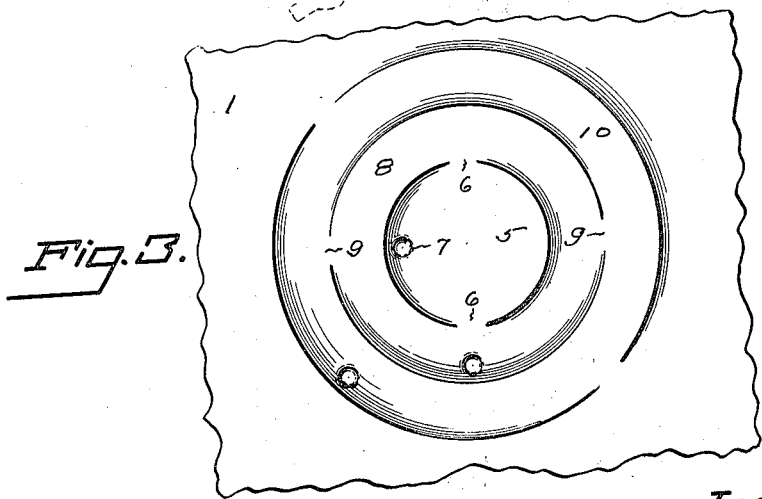
Inventor
Duncan C. Hooker by
Harry R. Williams
Attorney

UNITED STATES PATENT OFFICE.

DUNCAN C. HOOKER, OF FARMINGTON, CONNECTICUT, ASSIGNOR TO THE JOHNS-PRATT COMPANY, OF HARTFORD, CONNECTICUT, A CORPORATION OF CONNECTICUT.

KNOCK-OUT FOR ELECTRICAL BOXES.

1,295,168. Specification of Letters Patent. Patented Feb. 25, 1919.

Application filed June 27, 1918. Serial No. 242,279.

*To all whom it may concern:*

Be it known that I, DUNCAN C. HOOKER, a citizen of the United States, residing at Farmington, in the county of Hartford and State of Connecticut, have invented a new and useful Improvement in Knock-Outs for Electrical Boxes, of which the following is a specification.

This invention relates to the construction of the "knock-outs" arranged in the walls of sheet metal boxes designed for inclosing electrical apparatus, such as meter cabinets, fuse boxes, switch receptacles and the like casings. It is customary for manufacturers to displace, without complete removal, sections of the back, side, top and bottom walls of such casings in order that installers may knock out such displaced sections and produce openings of the necessary size and in the most accessible positions for the passage of the wires or cables, or for the attachment of inlet and outlet conduits, as the particular conditions found in the line installations with which the appliances are to be used, will require. These knock-outs are commonly provided by punching in sections of the sheet metal walls of the casings and severing the metal about the inset sections except at two or more places which are left to retain the punched sections in place, so that the installer will be required to fracture but a small amount of metal when knocking out a section. Frequently owing to variations in thickness the metal is not entirely severed and this renders it difficult to knock out the required section, and furthermore when the metal is inset one way the blows required to remove it cause the uncut retaining portions of the metal to stretch and the resistance offered necessitates the application of considerable force to complete the severance, and breakage accomplished in this manner leaves rough projections or burs which are undesirable and frequently bends in the wall of the box.

The object of the present invention is to provide a knock-out which may be easily removed by the application of comparatively little force and which is so constructed that it is self evident how that force is to be applied.

This object is attained by punching the metal of the section to be removed partly in one direction and partly in the opposite direction and leaving the uncut retaining metal on diametrically opposite sides. With this construction the knock-out to be removed may, by means of a nail, punch or other tool and a hammer, be hit on one side, the proper locality being indicated, and caused to rotate on the uncut portions of the metal as pivots, which action easily twists off the uncut portions and frees the knock-out.

Figure 1 of the accompanying drawings shows a plan of a portion of the wall of a casing designed for containing an electrical appliance, provided with a knock-out formed according to this invention. Fig. 2 shows a section of the same. Fig. 3 shows an arrangement of several concentric knock-outs whereby the hole through the wall of the casing may be any one of three different diameters, according to the conditions to be met.

The metal sheet 1 may be the back, side, top or bottom wall of a meter cabinet, fuse box, switch receptacle or the like casing. The knock-out 2 may be of any desired diameter. This knock-out is formed by punch and die and the metal severed so that substantially one half of the knock-out is offset from the sheet metal wall in one direction and substantially the other half is offset in the opposite direction. The punch and die are so formed that the metal is severed completely around the section forming the knock-out except at two diametrically opposite points 3, which diameter forms the axis of or is between the sections which are offset in opposite directions. In one of the inset faces near the edge of the severed portion and substantially midway between the uncut portions a small indentation 4 is desirably made.

In order to remove a knock-out formed in this manner the end of a punch, nail or other handy implement is inserted in the indentation and a blow given to the implement with a hammer or other tool. This causes the severed portion to turn on the uncut portions, as shown by dotted outline in Fig. 2, which rotary movement twists off the uncut portions and leaves the knock-out free. But very little force is required to twist the knock-out formed in this way and the place of the application of that force is self evident. Furthermore this does not bend in any portion of the wall of the box or leave rough projections or burs about the opening.

When it is desired to make provision for openings of several different diameters the knock-outs may be arranged concentrically, as shown in Fig. 3. In this case the small knock-out 5 is severed except at two points 6, and on one side of a line between these points it is offset in one direction and on the other side in the opposite direction, the indentation or recess 7 being provided as above described in an inset face near one edge midway between the uncut portions. If a small hole is required this piece is twisted out. For a larger hole the ring 8 is punched with one portion offset on one side and the other portion offset on the other side. In this case the uncut portions 9 are desirably arranged at right angles to those of the small knock-out 5 so that if only the small knock-out is to be removed the force required to twist it will not twist the ring. The larger ring 10 is so severed and punched that the uncut portions are in a position to resist the strains incident to the twisting out of the intermediate ring and the small knock-out. With this arrangement the removal of the smallest knock-out will not tend to twist either of the larger knock-outs.

The invention claimed is;

1. A knock-out for the wall of a metal casing for electrical appliance, consisting of a section of metal severed from the wall and offset from the plane of the wall on one side and a section of metal severed from the wall and offset from the plane of the wall on the opposite side.

2. A knock-out for the wall of a metal casing for electrical appliance, consisting of a section of metal severed from the wall and offset from the plane of the wall on one side, a section of metal separated from the wall and offset from the plane of the wall on the opposite side, and uncut sections at diametrically opposite points between the cut sections.

3. A knock-out for the wall of a metal casing for electrical appliance, consisting of a section of metal severed from the wall and offset from the plane of the wall on one side, a section of metal severed from the wall and offset from the plane of the wall on the opposite side, and an indentation in an inset face near the edge of one cut section intermediate the uncut sections.

4. A knock-out for the wall of a metal casing for electrical appliance, consisting of a section of metal severed from the wall and offset in one direction, a section of metal severed from the wall and offset in the opposite direction, uncut sections at diametrically opposite points between the cut sections, and an indentation in an inset face near the edge of one cut section intermediate the uncut sections.

5. A knock-out for the wall of a casing for electrical appliance, having a portion offset from the plane of the wall on one side and a portion offset from the plane of the wall on the opposite side, whereby said knock-out may be separated from said wall by twisting the knock-out on the portions which are not offset from the wall of the casing.

6. A knock-out for the wall of a casing for electrical appliance, consisting of a disk with a portion offset in one direction and a portion offset in the opposite direction and a ring surrounding said disk and having a portion offset in one direction and a portion offset in the opposite direction.

7. A knock-out for the wall of a casing for electrical appliance, consisting of a disk with a portion offset in one direction and a portion offset in the opposite direction and a ring surrounding said disk and having a portion offset in one direction and a portion offset in the opposite direction, the offset portions of said disk and the offset portions of said ring being positioned in angular relation to each other.

8. A knock-out in the wall of a casing for electrical appliance, having a portion pushed inward from the wall of the casing, a portion pushed outward from the wall of the casing, and an intermediate portion remaining in the plane of the wall of the casing, said knock-out being removed from the wall of the casing by turning it on the portion remaining in the plane of the wall of the casing.

DUNCAN C. HOOKER.